United States Patent
Mathur et al.

(10) Patent No.: US 6,879,327 B1
(45) Date of Patent: Apr. 12, 2005

(54) CREATING GRADIENT FILLS

(75) Inventors: Pankaj Mathur, New Delhi (IN); Prakash Ladia, New Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 192 days.

(21) Appl. No.: 09/935,006

(22) Filed: Aug. 21, 2001

(51) Int. Cl.[7] .................................... G09G 5/02
(52) U.S. Cl. .......................... 345/589; 345/606
(58) Field of Search .................. 348/589, 606–610, 348/FOR 169, 212, 3, 33, 60, 70, 577; 358/2.15; 359/653, 654; 382/164

(56) References Cited

U.S. PATENT DOCUMENTS

| | | | | |
|---|---|---|---|---|
| 4,096,217 A | * | 6/1978 | Roll ........................ | 264/20 |
| 5,982,379 A | * | 11/1999 | Suzuki et al. ............ | 345/431 |
| 6,201,550 B1 | * | 3/2001 | Sakamoto ................ | 345/442 |

OTHER PUBLICATIONS

"Adobe Illustrator 10, User Guide", Adobe Systems, Incorporated; 2001, pp. 220–227.

* cited by examiner

Primary Examiner—M. Bella
Assistant Examiner—G. F. Cunningham
(74) Attorney, Agent, or Firm—Fish & Richardson P.C.

(57) ABSTRACT

Methods and apparatus, including computer program products, implementing and using techniques for defining a color gradient to be applied to a region. A gradient starting point is defined, a gradient ending point is defined, at least one intermediary point between the gradient starting point and the gradient ending point is defined, and a set of gradient attributes is defined. A first and a second set of values are defined for the set of gradient attributes, the first set of values defining a transition between the gradient starting point and the at least one intermediary point, and the second set of attribute values defining a transition between the at least one intermediary point and the gradient ending point. The first and second set of values are distinct.

57 Claims, 2 Drawing Sheets

CREATING GRADIENT FILLS

BACKGROUND OF THE INVENTION

The present invention relates to color gradients in a computer graphics application.

In many computer systems, information is represented and conveyed to a user through digital images. The digital images can take many different forms such as alphanumeric characters, graphs and a variety of pictorial representations. The digital images are typically conveyed to a user on a display device, such as a video monitor, or through a printing device, such as a color printer and the like. Typically, the digital images are stored in digital form, manipulated and then displayed to the user.

A digital image can be a geometric description of a two or three-dimensional scene. The geometric description can be manipulated by the user and converted to digital raster image data or vector data for display. How a two or three dimensional object appears when the object is displayed to the user depends on numerous factors including the types of light sources illuminating the object, properties of the object such as color, texture and reflectance, and the object's position and orientation with respect to the light sources, the viewer and other surfaces that may reflect light on the object.

It is often desirable to present objects for display in color. In conventional systems, color may be applied to a region by defining a single color for the entire region (a "flat" coloring), or to add realism, a plurality of colors may be employed. In order to display a realistic image, a smooth transition between colors across painted areas is required. Such a transition is referred to as a color gradient.

Color gradients can be generated in several ways. One way is to select a starting color, an ending color and, optionally, one or more intermediate colors on a gradient ramp. A representation of the gradient can be displayed to a user in a gradient bounding box during the creation of the gradient, so that the user can view the appearance of the gradient before applying the gradient to one or more objects. A linear gradient defines a color change along a line. A radial gradient defines a color change along the radius of a circle, so that concentric circles of constant color are obtained.

In addition to selecting the colors of the gradient, a user can conventionally select a number of attributes of the gradient. Examples of such attributes include angle, horizontal and vertical offset, and edge padding. The angle attribute is associated with a linear gradient and typically defines the gradient's angle to an imaginary horizontal axis on the display screen. The horizontal and vertical offset attributes are associated with a radial gradient and typically define the distance between a center point of a radial gradient and the center of the gradient bounding box. The edge padding attribute defines how long starting and ending colors remain constant along the edge of a gradient before blending with other colors.

Although the gradient attributes allow a user to further refine the visual appearance of a given gradient, the attributes have conventionally only been applied to the entire gradient, that is, to the entire object to which the gradient is to be applied. For example, a linear color gradient can traverse N colors between the starting and ending colors and can have an angle attribute, as described above. However, in conventional systems the gradient follows the selected angle through all the N colors. Similarly, if a radial gradient traverses N colors between the starting and ending colors, circles of constant color will be centered at the same point.

Furthermore, a gradient is generally generated in a gradient bounding box of a given size. When the gradient is applied to an object, the gradient is scaled up or down to fit the object dimensions. If a gradient is applied to a number of objects having different dimensions, the gradient appearance will vary between the objects unless a unique gradient is generated for each object.

SUMMARY OF THE INVENTION

In general, in one aspect, this invention provides methods and apparatus, including computer program products, implementing and using techniques for defining a color gradient to be applied to a region. A gradient starting point, a gradient ending point, at least one intermediary point between the gradient starting point and the gradient ending point and a set of gradient attributes are defined. A first and a second set of values for the set of gradient attributes are defined. The first set of values defines a transition between the gradient starting point and the at least one intermediary point. The second set of attribute values defines a transition between the at least one intermediary point and the gradient ending point. The first and second set of values are distinct.

Advantageous implementations can include one or more of the following features. The color gradient can further be rendered in accordance with the gradient starting point, the gradient ending point, the at least one intermediary point, and the first and second set of values for the set of gradient attributes. The rendered gradient can be applied to a region including scaling the gradient to fit the region. The region can correspond to an object. One or more copies of the rendered gradient can be applied to a region until the region is covered. Each copy can have an identical size and shape to the rendered gradient.

The first and second set of values may be different The first and second set of values can be defined by a user input. Two intermediary points can be defined and a third set of attributes can be defined, wherein the third set of attributes defines a transition between the two intermediary points. Rendering the color gradient can include rendering the color gradient in accordance with the defined gradient starting point, the gradient ending point, the two intermediary points and the first, second and third set of attributes.

The color gradient can be a linear color gradient and the set of gradient attributes can include an angle attribute. Defining a first and a second set of values can include defining a value of the angle of the color gradient relative to a tangent of a bounding box edge for the region to which the color gradient is to be applied.

The color gradient can be a radial color gradient and the set of gradient attributes can include an offset attribute. Defining a first and a second set of values can include defining a value of the offset of the color gradient relative to a center of a bounding box for the region to which the gradient is to be applied. The offset may be in a horizontal or vertical direction relative to the center of the bounding box.

The set of attributes can include a color attribute and a color can be defined for one or more of the at least one intermediary point, the starting point and the ending point. The set of attributes can include a rate of change attribute, and defining a first and a second set of values can include defining a value of a rate of change of a color in the color gradient between a color associated with one of the starting point, the ending point, and the at least one intermediary point and a color associated with an adjacent point.

A color can be represented by a set of color components and defining a value of a rate of change can include defining a value of a rate of change for one or more color components in the color gradient between a color component set associated with one of the starting point, the ending point, and the at least one intermediary point and a color component set associated with an adjacent point.

The set of attributes can include a constant color attribute, and defining a first set and a second set of values can include defining a value of the constant color attribute defining a portion of the color gradient for which a color component remains constant. The set of colors can include a color traversal attribute and a set of colors to be traversed between two points in the color gradient can be defined. The set of colors can be defined though selecting the colors in a color wheel.

The set of attributes can include a color function attribute and a mathematical function describing a color variation between two points in the color gradient can be defined. The mathematical function can be a non-linear mathematical function. The mathematical function can describe the variation of one or more color components between the two points in the color gradient. The mathematical function can be described by receiving a user input.

The set of attributes can include a color contour function attribute, and a mathematical function describing a color contour between two points in the color gradient can be defined. The mathematical function can be non-linear. A user input specifying the mathematical function can be received.

A mathematical function describing a variation of a gradient attribute between two points in the color gradient can be described. The gradient attribute may be selected from the group consisting of an angle, an offset in a horizontal direction, an offset in a vertical direction, a rate of change for a color, and a portion of the color gradient having constant color.

In general, in one aspect, this invention provides methods and apparatus, including computer program products, implementing and using techniques for defining a color gradient to be applied to a region. A gradient starting point is defined, a gradient ending point is defined, at least one intermediary point between the gradient starting point and the gradient ending point is defined, a set of gradient attributes is defined. A first and a second set of values for the set of gradient attributes can be defined. The first set of values defines a transition between the gradient starting point and the at least one intermediary point, and the second set of attribute values defines a transition between the at least one intermediary point and the gradient ending point. The first and second set of values are distinct.

The invention can be implemented to realize one or more of the following advantages. This method allows significantly more flexibility and artistic freedom compared to conventional gradient rendering methods, in that a user can control not only the shape and color of the gradient as a whole, but also individual sections of the gradient. Any gradient property can be made to vary in accordance with any type of mathematical function, which is not possible in conventional gradients. A uniform appearance can also be achieved, even when the gradient is applied to multiple objects having different dimensions.

A number of advantages can also be obtained compared to using two or more prior art gradients and placing them next to each other. For example, if user wants to place two prior art gradients next to one another, the ending color of the first gradient has to match the starting color of the second gradient. That is, the user has to define the same color twice, one time for the first gradient and one time for the second gradient. This is a time consuming process, in particular if there are several gradients involved.

Another advantage relates to matching of attributes. If a first conventional gradient has an angle attribute with a particular value and the user would like an adjacent conventional gradient to have an angle attribute with the same value, the user has to define the same attribute twice. The present invention allows a user to define the attribute one time for one gradient and achieve the same result. This is true not only for the angle attribute, but also for any other attribute that can be applied to a gradient.

Yet another example arises if two or more conventional gradients have been applied to a region or object, and the object subsequently is resized. Using conventional techniques, each gradient has to be manually resized to fit the new object. The present invention allows for automatically resizing when an object to which a gradient has been applied is resized.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Digital images can be stored as a geometric description of a scene. The description can be manipulated by a user invoking a drawing application or other graphics application, then converted to digital raster image data for output. An example of a drawing application is Adobe® Illustrator®, available from Adobe Systems Incorporated of San Jose, Calif.

Figure 1:
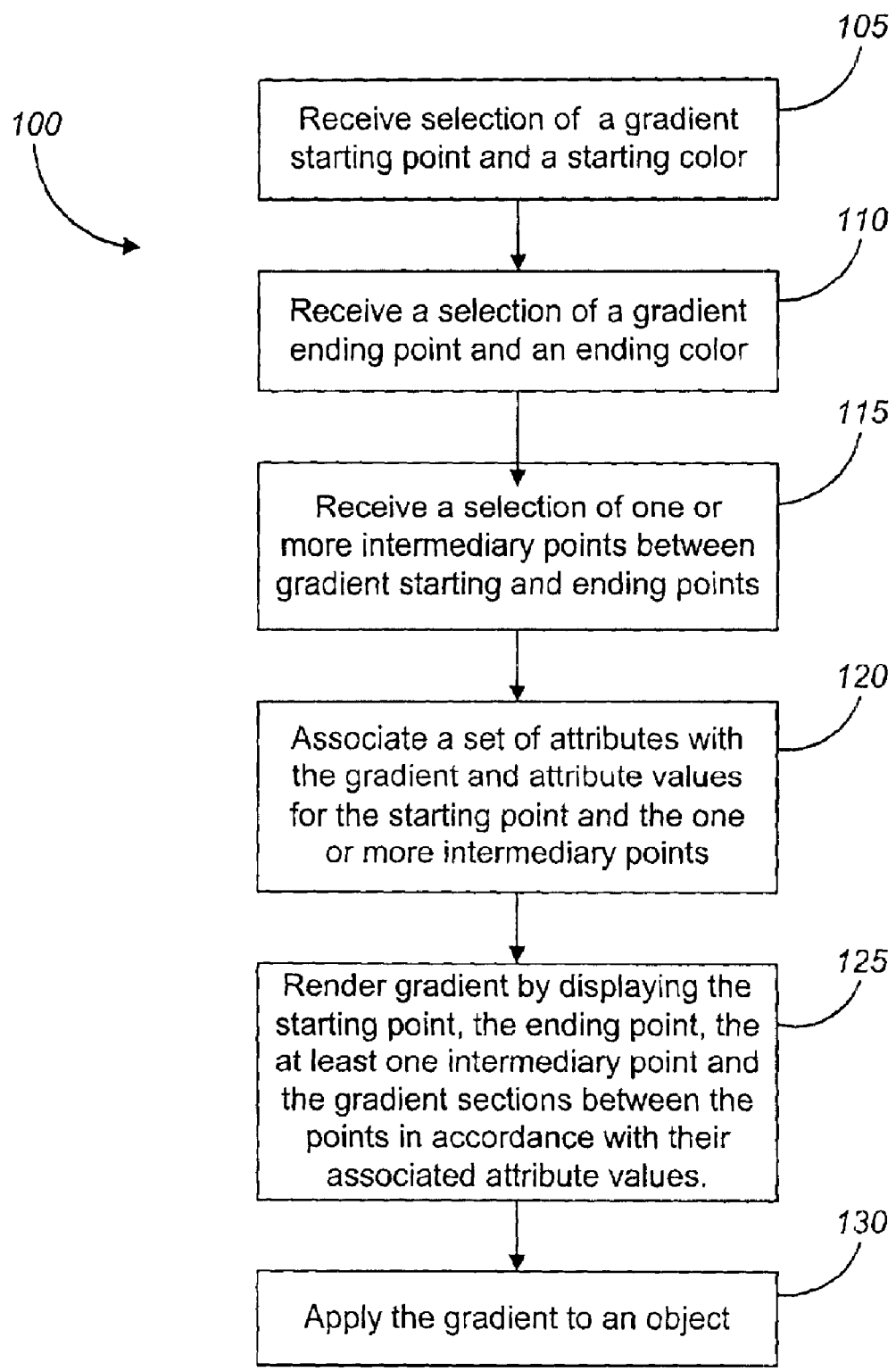
FIG. 1 is a block diagram showing a process for creating a color gradient.

As is shown in FIG. 1, a process (100) for defining and rendering a color gradient in accordance with the invention starts by receiving a selection of a gradient starting point and an associated starting color (105). A convenient way for a user to select the starting color is to use a gradient ramp, which is a common tool in many computer graphics applications. An example of a gradient ramp description can be found in Adobe® Illustrator® 9.0 User Guide for Windows® and Macintosh (Adobe Systems Incorporated, 2000). The selection of a gradient starting point and a starting color, also referred to as starting color stop, can either be made by a user or automatically when receiving a starting color of an object illustrated in a computer graphics application. The process then continues with receiving a selection of a gradient ending point and an associated ending color (110), also referred to as an ending color stop, on the gradient ramp. The ending color stop can be selected in the same way as the starting color stop was selected.

The process also receives a selection of one or more intermediary points on the gradient ramp between the starting and ending color stops (115). As with the selections above, the intermediary point(s) can either be selected automatically by the graphics application or by a user. The intermediary points represent points along the gradient at which one or more attributes of the gradient can be changed.

The location of the intermediary points in relation to the starting and ending color stops on the gradient ramp is the same as the relative location in the final gradient after the gradient has been rendered. In order to accomplish a localized change of attributes, the process associates a set of attribute types with the gradient. Each attribute type is then assigned an attribute value for each of the intermediary points and the starting point (120). Examples of attribute values include scalars, sets of scalars or mathematical functions. The different attribute types will be discussed in further detail below.

When the attribute types have been defined and attribute values have been set for each of the intermediate points and the starting point, the color gradient is rendered (125) in a gradient bounding box by displaying the starting point, intermediary point(s) and ending point, and displaying the computed colors for each point and each gradient section between the points. The rendering of the color gradient is accomplished by parsing the gradient into subsections, so that any two adjacent points on the gradient become starting and ending points, respectively, for a subsection. Each subsection is then rendered separately using conventional gradient rendering techniques, and finally the subsections are assembled into one gradient. The starting and ending points of the final gradient are located on a respective first and second edge of the bounding box, and the intermediary points are located inside the box. The user can then change one or more attribute types and attribute values of the gradient until a gradient corresponding to his or her preferences has been obtained.

Finally, the newly created color gradient is applied to one or several objects (130) that have been selected by a user or by the computer graphics application prior to the creation of the gradient. The color gradient has been created in a gradient bounding box and can be applied to the object(s) in essentially two different ways. The first way to apply the gradient is the same way in which gradients are applied in most conventional drawing application programs. The one or more objects typically have an object bounding box and when the gradient has been rendered, the gradient bounding box is scaled up or down to fit the object bounding box and the gradient is applied to the one or more objects. However, if this method is used to apply a gradient to a number of objects with different dimensions, the appearance of the gradient in each of the objects will vary, which may not always be what the user desires.

A second way to apply the gradient to one or more objects includes the use of a repeatable pattern. Instead of scaling the gradient to fit the object bounding boxes, the repeatable pattern defining the gradient is applied in scale to the objects. This prevents the gradient from becoming "stretched" or "compressed" when the gradient is applied to objects, and gives the objects a more uniform appearance. For example, assume that a color gradient is specified on a 10 by 10 point scale in a CMYK system and has a starting color of C0=(0, 0, 0, 100) and an ending color of C1=(0, 0, 0, 0). If this color gradient is applied to an object with the dimensions 100 by 100 points, the resulting gradient after application to the object will have a color pattern of (C0, C1, C0, C1, C0, C1, C0, C1, C0, C1, C0, C1, C0, C1, C0, C1, C0, C1) with an inter-color spacing of 10 points.

The description will now continue with a number of examples of different types of attributes that may be associated with the starting point and intermediary points, as was briefly described above in connection with steps (125) and (130). The exemplary attributes to be discussed here include color functions, contouring functions, angle, horizontal and vertical offset, number of steps, edge padding distance, and color direction.

Color Functions

A color in a graphics application is typically represented by one or more color components. For example, in an RGB color space, all colors are represented by a combination of the color components Red, Green and Blue, and in a CMYK color space, the corresponding colors are instead represented by a combination of the color components Cyan, Magenta, Yellow and a Key color (Black). The amount of each color component is determined by a color component value. Conventionally, a color change between two colors in a gradient is generated by interpolating each of the color components between the color component values in the first color and the color component values in the second color.

In the proposed gradient, one attribute in the set of attributes may be a color function represented by a mathematical function (linear or non-linear) that specifies a transition for one or more color components between a point on the gradient to which the mathematical function is associated and an adjacent point. For example, in one implementation of the invention, the colors in a section of a gradient between any two points can be made to vary based on a governing equation. If a first point, located at x=0, on the gradient has an associated color component value $C(0)=C0$ and a second point on the gradient, located at x=1, has an associated color component value $C(1)=C1$, then the color of the section of the gradient between the first and second points can be made to vary in accordance with a function $f(x)$, where $f(0)=0$ and $f(1)=1$. The color component value, $C(x)$, at any given position along the gradient between the first and second points can be described as $C(x)=C0+f(x)(C1-C0)$. Since $f(x)$ can be virtually any function that fulfills the above constraints, a great variety of color transitions can be obtained for the color component, such as linear transitions, quadratic transitions, logarithmic transitions and sinusoidal transitions (for which multiple cycles of colors optionally can be generated depending on the range of angles used in the calculations).

A different portion of the gradient, for example, between the second point having a color component value C1 and a third point having a color component value C2 may have a different associated function, $g(x)$, such that the color component value at any given point between the second point and the third point can be given by $C(x)=C1+g(x)(C2-C1)$.

The same function can be applied to each of the color components in the gradient to achieve a uniform color change across the gradient for all the color components. Alternatively, one or more color components may have different associated functions to achieve further variation along the color gradient, for example, so that the red component in an RGB color representation has a sinusoidal variation, the green component has a linear variation, and the blue component has a logarithmic variation.

The color functions above have been described in the context of a linear gradient, but are equally useful for radial gradients, in which case a mathematical function $f(r)$ can be specified that is dependent on the radius r. The resulting gradient includes concentric circles that vary in the same manner that has been described for the linear gradients above.

Contouring Functions

In the color functions described above, the color transition along any section of the gradient, no matter whether the gradient is linear or radial, is dependent on one variable only. In the case of a linear gradient, this variable is measured in the propagation direction of the gradient. Consequently, the color of the gradient is determined by parallel lines of constant color perpendicular to the gradient. In the case of a radial gradient, the variable is measured in the radial direction of the gradient and the color of the gradient is determined by concentric circles of constant color. The color of each parallel line or concentric circle in the respective gradient is determined by the one or more mathematical functions that are associated with different sections of the gradient.

If, however, the functions determining the color of the different gradient sections are made to depend on more than one variable, a contouring attribute can be created. The linear gradient is no longer limited to parallel lines of constant color, but can have a color variation perpendicular to the propagation direction of the gradient. Furthermore, by applying different functions to different sections of the gradient, the color variation perpendicular to the propagation direction of the gradient can be varied between the different sections of the gradient. Instead of having lines of constant color perpendicular to the color gradient propagation direction, the lines of constant color can, for example, become slanting lines or virtually any type of curves that span across the gradient. The linear gradient can then instead be more accurately described as a two-dimensional color gradient represented in a Cartesian coordinate system. A gradient is typically defined in a gradient bounding box, which is mapped to the region of the screen to which the gradient is to be applied, such as a region that includes a single object or a collection of objects, when the gradient has been created. A bounding box can also be used in one implementation of the invention to define a two-dimensional gradient. The contouring attribute is defined by a two-dimensional function and can be expressed as $C(x,y)=C0+f(x,y)(C1-C0)$ with C0 and C1 defined in a similar way as the color functions above, and where x and y can be measured in a local coordinate system for the bounding box in which the gradient is generated.

Similarly, a radial gradient is no longer limited to concentric circles of constant color. Instead the color can vary as a function of the angle, $\theta$, in a polar coordinate system. Since the functions may vary for different parts of the radial gradient, virtually any types of lines or curves of constant color can be achieved, and the resulting color gradient becomes a two-dimensional color gradient, represented in a polar coordinate system. A general expression for a color component value in a two-dimensional gradient represented in a polar coordinate system, at any point $(r, \theta)$, is $C(r, \theta)=C0+f(r, \theta)(C1-C0)$. The conventional distinction between linear and radial gradients is thus replaced by a two-dimensional color gradient that may be represented in a Cartesian coordinate system or in a polar coordinate system.

In order to provide a user-friendly way of specifying lines of constant color, the application can receive a user input of a contour line made by a conventional graphics input tool, such as a computer mouse. In one implementation of the invention, the contour line is represented by a Bezier curve, which can be transformed into a function to be used in the expressions above. Different Bezier functions can be defined for different parts of the curve, so that, a rainbow contour can be generated for one section of the gradient while a wavy contour is generated for another section of the color gradient, for example.

Other attributes may vary as functions along the gradient, for example, the angle may vary as a function. However, these other attributes may also be described as scalars and for clarity these other attributes will be discussed in terms of scalars. It should be noted that many additions and variations to the attributes presented below, can be achieved with the more general functional approach presented above.

Angle

Angle is an attribute that defines the propagation direction for a linear gradient. In one implementation of the invention, the angle is measured in relation to an imaginary horizontal axis on the display screen, and the value of the angle can range from $-180$ degrees to 180 degrees. This attribute is not defined for a purely radial gradient. By associating different angles with different parts of the gradient, a wide variety of gradients can be generated in which not all lines of constant color are parallel. The angle of a specific section of the gradient does not have to be related to the imaginary horizontal axis, but can also depend on the angle of a previous section of the gradient, so that the angle increases by ten degrees compared to a previous angle value for each section of the gradient, for example.

Horizontal and Vertical Offset

The horizontal and vertical offsets are attributes of radial gradients. The horizontal and vertical offsets specify the distance of the center point of a radial gradient from the edges of the gradient bounding box. Horizontal and vertical offset are not defined for a purely linear gradient. By associating different offsets with different points in a gradient, rather than only with the staring point, the radial gradient no longer has to be defined by concentric circles, but can instead include circles that are slightly juxtaposed in relation to each other. The circles do not have constant color and a great variety of gradients may be created.

Number of Steps

The "number of steps" attribute specifies the number of intermediate colors to be displayed between any two points on a gradient ramp. A small value for the number of steps attribute requires the colors to change more for each step, while a larger value for the number of steps attribute allows the colors to change less for each step, thereby achieving a more smooth-looking transition between the two points of the gradient. The number of steps attribute can be used for any type of gradient. By associating different numbers of steps with different sections of a gradient, a smooth looking section may be followed by a less smooth-looking section, rather than having uniform smoothness across the entire gradient.

Edge Padding Distance

The edge padding distance attribute defines the distance over which a color should remain constant along the gradient before the color starts blending with a following color. A higher value of the edge padding distance attribute means that the color will remain constant for a long distance and that the transition to the next color will occur rapidly, while a lower value of the edge padding distance attribute means that the color will be constant only for a short distance and then transition smoothly over a longer distance into the next color. The edge padding distance is measured along the gradient. By associating different edge padding distances with different colors, the color change may occur more rapidly in some sections and slower in some, rather than being uniform across the entire gradient.

Color Direction

In some applications, such as Adobe® Illustrator®, the colors available for display are represented in a circular color wheel. The color direction simply defines how two colors on the gradient are joined, that is, which intermediate colors the gradient displays when the gradient transitions between the two colors. Examples of color directions relating to a circular color wheel are: direct (that is, the starting and ending colors are joined by a straight line), counter-clockwise (that is, the starting and ending colors are joined by a line going counter-clockwise through the color wheel), and clockwise (that is, the starting and ending colors are joined by a line going clockwise through the color wheel).

Figure 2:
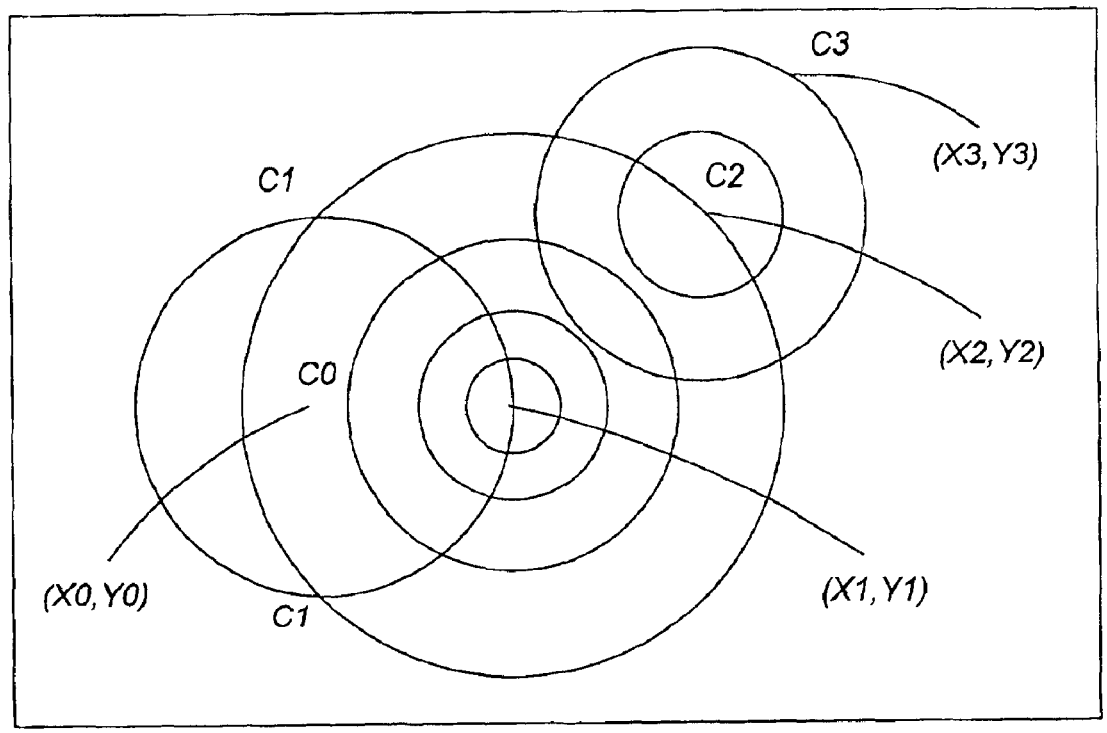
FIG. 2 is a schematic illustration of a radial gradient including three user defined color points.

FIG. 2 shows a schematic example of how a radial color gradient can be created in accordance with the invention. Assume that a user wishes to create a radial color gradient between colors C0, C1, C2 and C3. The user selects C0 to be the starting color, C3 to be the ending color, and C2 and C3, respectively, to be intermediate colors. It should be noted that C2 and C3 do not necessarily have to be colors. For example, if a user only wishes to create a color gradient between colors C0 and C3, then C1 and C2 could be intermediary points that are associated with some attribute other than color, such as a number of steps attribute that determines the rate of change fore colors between C1 and C2, and C2 and C3, respectively.

After selecting the starting, ending, and intermediate colors, the user can associate a horizontal and a vertical offset with each of the colors, such that the color C0 is located at (X0, Y0), C1 is located at (X1, Y1), C2 is located at (X2, Y2), and C3 is located at (X3, Y3) in a coordinate system that is local to the gradient bounding box and has an origin in the center of the gradient bounding box.

First, the portion of the gradient extending between colors C0 and C1 is generated. Thereafter, the second portion of the gradient extending between C1 and C2, and the portion of the gradient extending between C2 and C3 are generated. The resulting gradient contains circles that are not of constant color. For example, the periphery of the circle that is centered around (X1, Y1) will have a color that varies from C1 to C2 and back to C1 again. This method can be used for any number of colors, thereby creating significantly more flexibility and artistic freedom compared to conventional gradient rendering methods.

Other types of attributes can be varied in an analogous way to the offset attribute, as has been described above. For example, the angle of a linear gradient can vary along the gradient, the number of steps can be different for different parts of the gradient, different colors or sections of the gradient may have different edge padding, and the color direction can change for different sections of the gradient between different colors intermediate to the starting color and the ending color.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor, and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from and to transmit data and instructions to, a data storage system, at least one input device and at least one output device. Each computer program can be implemented in a high-level procedural or object-oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the steps of the invention can be performed in a different order and still achieve desirable results. Attributes may be assigned to the gradient ending point instead of the gradient starting point. Attributes do not have to be associated with points along the gradient ramp, but can instead be associated with specific colors along the gradient. The colors associated with different parts of the gradient can be defined in different color spaces. Additional types of gradients, such as angle gradients, reflected gradients, conical gradients, diamond gradients and so on can be rendered using the contour functions described above.

What is claimed is:

1. A computer-implemented method for defining a color gradient to be applied to a region, the method comprising:

receiving user input defining a gradient starting point for a color gradient to be applied to fill a region of an image, the color gradient defining a transition between colors in the region;

receiving user input defining a gradient ending point;

receiving user input defining at least one intermediary point between the gradient starting point and the gradient ending point; and receiving user input defining a first and a second set of values for a set of gradient attributes, the first set of values defining a smooth transition of colors between the gradient starting point and the at least one intermediary point, and the second set of values defining a smooth transition of colors between the at least one intermediary point and the gradient ending point, wherein the first and the second set of values are distinct.

2. The method of claim 1, further comprising:

rendering the color gradient in accordance with the gradient starting point, the gradient ending point, the at least one intermediary point, and the first and second set of values for the set of gradient attributes.

3. The method of claim 2, further comprising:

applying the rendered color gradient to a region including scaling the gradient to fit the region.

4. The method of claim 3, wherein the region corresponds to an object.

5. The method of claim 2, further comprising:
applying one or more copies of the rendered color gradient to a region util the region is covered.

6. The method of claim 5 wherein the region corresponds to an object.

7. The method of claim 5, wherein each copy has an identical size and shape to the rendered color gradient.

8. The method of claim 1, wherein the first and second set of values are defined by a user input.

9. The method of clam 1, further comprising:
defining two intermediary points; and
defining a third set of values for the set of gradient attributes, the third set of values defining a transition between the two intermediary points, wherein the first, second, and third set of values contain distinct values.

10. The method of 9, further comprising:
rendering the color gradient in accordance with the defined gradient starting point, the gradient ending point, the two intermediary points and the first, second and third set of attributes.

11. The method of claim 1, wherein the color gradient is a linear color gradient and the set of gradient attributes includes an angle attribute having a value defining a distinct angle of the color gradient relative to a tangent of a bounding box edge for the region to which the color gradient is to be applied.

12. The method of claim 1, wherein the color gradient is a radial color gradient and the set of gradient attributes includes an offset attribute having a value defining a distinct offset of the color gradient relative to a center of a bounding box for the region to which the color gradient is to be applied.

13. The method of claim 12, wherein defining a distinct value of the offset includes:
defining a value of an offset in a horizontal direction relative to the center of the bounding box.

14. The method of claim 12, wherein defining a distinct value of the offset includes:
defining a value of an offset in a vertical direction relative to the center of the bounding box.

15. The method of claim 1, wherein the set of gradient attributes includes a color attribute having a value defining a distinct color for each of the at least one intermediary point, the starting point and the ending point.

16. The method of claim 1, wherein the set of gradient attributes includes a rate of change attribute having a value defining a distinct rate of change of a color in the color gradient between a color associated with one of the starting point, the ending point, and the at least one intermediary point and a color associated with an adjacent point.

17. The method of claim 16, wherein a color is represented by a set of color components and defining a distinct value of a rate of change includes:
defining a value of a rate of change for one or more color components in the color gradient between a color component set associated with one of the start point, the ending point, and the at least one intermediary point and a color component set associated with an adjacent point.

18. The method of claim 15, wherein the set of gradient attributes includes a constant color attribute having a value defining a distinct constant color attribute defining a portion of the color gradient for which a color component remains constant.

19. The method of claim 15, wherein the set of gradient attributes includes a color traversal attribute having a value defining a distinct set of colors to be traversed between two defined points in the color gradient.

20. The method of claim 19, wherein defining a distinct set of colors comprises:
defining a set of colors including colors in a color wheel.

21. The method of claim 1, wherein the set of gradient attributes includes a color function attribute having a value dining a distinct mathematical function describing a color variation between two points in the color gradient.

22. The method of claim 21, wherein the distinct mathematical function is a non-linear mathematical function.

23. The method of claim 21, wherein the distinct mathematical function is a mathematical function describing the variation of one or more color components between the two points in the color gradient.

24. The method of claim 21, wherein the distinct mathematical function is user-specified mathematical function.

25. The method of claim 1, wherein the set of gradient attributes includes a color contour function attribute having a value defining a distinct mathematical function describing a color contour between two points in the color gradient.

26. The method of claim 25, wherein the distinct mathematical function is a non-linear mathematical function.

27. The method of claim 25, wherein defining the distinct mathematical function is a user-specified mathematical function.

28. The method of claim 1, further comprising:
defining a mathematical function describing a variation of a gradient attribute between two points in the color gradient, the gradient attribute being selected from the group consisting of an angle, an offset in a horizontal direction, an offset in a vertical direction, a rate of change for a color, and a portion of the color gradient having constant color.

29. A computer program product for defining a color gradient to be applied to a region, the computer program product comprising instructions operable to cause a computer to:
receive user input defining a gradient starting point for a color gradient to be applied to fill a region of an image, the color gradient defining a transition between colors in the region;
receive user input defining a gradient ending point;
receive user input defining at least one intermediary point between the gradient starting point and the gradient ending point; and
receive user input defining a first and a second set of values for a set of gradient attributes, the first set of values defining a smooth transition of colors between the gradient starting point and the at least one intermediary point, and the second set of values defining a smooth transition of colors between the at least one intermediary point and the gradient ending point, wherein the first and second set of values contain distinct values.

30. The computer program product of claim 29, further comprising instructions operable to cause a computer to:
render the color gradient in accordance with the gradient starting point, the gradient ending point, the at least one intermediary point, and the first and the second set of values for the set of gradient attributes.

31. The computer program product of claim 30, further comprising instructions operable to cause a computer to:
apply the rendered color gradient to a region including scaling the gradient to fit the region.

32. The computer program product of claim 31, wherein the region corresponds to an object.

33. The computer program product of claim 30, further comprising instructions operable to cause a computer to:
apply one or more copies of the rendered color gradient to a region until the region is covered.

34. The computer program product of claim 33, wherein the region corresponds to an object.

35. The computer program product of claim 33, wherein each copy has an identical size and shape to the rendered color gradient.

36. The computer program product of claim 29, wherein the first and second set of values are defined by a user input.

37. The compute program product of clam 29, further comprising instructions operable to cause a computer to:
define two intermediary points; and
define a third set of values for the set of gradient attributes, the third set of values defining a transition between the two intermediary points, wherein the first, the second, and the third set of values contain distinct values.

38. The computer program product of claim 37, comprising instructions operable to cause a computer to:
render the color gradient in accordance with the defined gradient starting point, the gradient ending point, the two intermediary points and the first, the second and the third set of values.

39. The computer program product of claim 29, wherein the color gradient is a linear color gradient and the set of gradient attributes includes an angle attribute, having a value defining a distinct angle of the color gradient relative to a tangent of a bounding box edge for the region to which the color gradient is to be applied.

40. The computer program product of claim 29, wherein the color gradient is a radial color gradient and the set of gradient attributes includes an offset attribute having a value defining a distinct offset of the color gradient relative to a center of a bounding box for the region to which the color gradient is to be applied.

41. The computer program product of claim 40, wherein the value defining a distinct offset
defines a value of an offset in a horizontal direction relative to the center of the bounding box.

42. The computer program product of claim 40, wherein the value defining a distinct offset
define defines a value of an offset in a vertical direction relative to the center of the boding box.

43. The computer program product of claim 29, wherein the set of gradient attributes includes a color attribute having a value defining a distinct color for each of the at least one intermediary point, the starting point and the ending point.

44. The computer program product of claim 29, wherein the set of gradient attributes includes a rate of change attribute having a distinct value defining a rate of change of a color in the color gradient between a color associated with one of the starting point, the ending point, and the at least one intermediary point and a color associated with an adjacent point.

45. The computer program product of claim 44, wherein a color is represented by a set of color components and the distinct value defining a rate of change defines a rate of change for one or more color components in the color gradient between a color component set associated with one of the starting point, oint, and the at least one intermediary point and a color component set associated with an adjacent point.

46. The computer program product of claim 43, wherein the set of gradient attributes includes a constant color attribute having a value defining a distinct constant color attribute defining a portion of the color gradient for which a color component remains constant.

47. The computer program product of claim 43, wherein the set of gradient attributes includes is a color traversal attribute a value defining a distinct set of colors to be traversed between two defined points in the color gradient.

48. The computer program product of claim 47, wherein the distinct set of colors selected from a color wheel.

49. The computer program product of claim 29, wherein the set of gradient attributes includes a color function having a value defining a distinct mathematical function describing a color variation between two points in the color gradient.

50. The computer program product of claim 49, wherein the distinct mathematical function is a non-linear mathematical function.

51. The computer program product of claim 49, wherein the distinct mathematical function describes the variation of one or more color components between the two points in the color gradient.

52. The computer program product of claim 49, wherein the distinct mathematical function is a user-specified mathematical function.

53. The computer program product of claim 29, wherein the set of gradient attributes includes a color contour function attribute having a value defining a distinct mathematical function describing a color contour between two points in the color gradient.

54. The computer program product of claim 53, wherein the distinct mathematical function is a non-linear mathematical function.

55. The computer program product of claim 53, wherein the distinct mathematical function is a user-specified mathematical function.

56. The computer program product of claim 30, further comprising instructions operable to cause a computer to:
define a mathematical function describing a variation of a gradient attribute between two points in the color gradient, the gradient attribute being selected from the group consisting of an angle, an offset in a horizontal direction, an offset in a vertical direction, a rate of change for a color, and a portion of the color gradient having constant color.

57. A computer-implemented method for rendering a color gradient to be applied to fill a region, the method comprising:
receiving user input defining a gradient starting point for a color gradient to be applied to fill a region of an image, the color gradient defining a transition between colors of the image and the gradient starting point being associated with a starting color;
receiving user input defining a gradient ending point, the gradient ending point being associated with an ending color;
receiving user input defining at least one intermediary point between the gradient staring point and the gradient ending point, the at least one intermediary point being associated with an intermediate color, the starting color, the ending color, and the intermediary color being distinct colors;
associating a set of gradient attribute values with the at least one intermediary point and one of the gradient staring point and the gradient ending point, each set of values defining a smooth color transition between the associated point and an adjacent point, wherein each set of values are distinct; and rendering the color gradient in accordance with the gradient staring color, the gradient ending color, the at least one intermediate color and the receptive sets of values associated with the gradient staring point, the gradient ending point and the least one intermediary point.

* * * * *

UNITED STATES PATENT AND TRADEMARK OFFICE
CERTIFICATE OF CORRECTION

PATENT NO. : 6,879,327 B1
APPLICATION NO. : 09/935006
DATED : April 12, 2005
INVENTOR(S) : Prakash Ladia and Pankaj Mathur It is certified that error appears in the above-identified patent and that said Letters Patent is hereby corrected as shown below:

Title Page, [*]Notice, delete "by 192 days" and replace with --by 256 days--.

Column 12, line 10, delete "dining" and replace with --defining--.

Column 13, line 14, delete "compute" and replace with --computer--.
 line 22, after the comma, insert --further--.
 line 46, delete "define".
 line 47, delete "boding" and replace with --bounding--.
 line 64, delete "oint" and replace with --the ending point--.

Column 14, line 7, delete "is".
 line 8, after "attribute", insert --having--;
 line 13, after "function", insert --attribute--;
 line 37, delete "30" and replace with --29--.

Signed and Sealed this

Seventh Day of August, 2007

JON W. DUDAS
*Director of the United States Patent and Trademark Office*